US009040940B2

(12) United States Patent
Itaya et al.

(10) Patent No.: US 9,040,940 B2
(45) Date of Patent: May 26, 2015

(54) SCINTILLATOR PANEL AND PRODUCTION METHOD THEREOF, FLAT PANEL DETECTOR AND PRODUCTION METHOD THEREOF

(75) Inventors: Keiko Itaya, Tokyo (JP); Yoshihiro Goroya, Tokyo (JP)

(73) Assignee: KONICA MINOLTA MEDICAL & GRAPHIC, INC., Tokyo (JP)

( * ) Notice: Subject to any disclaimer, the term of this patent is extended or adjusted under 35 U.S.C. 154(b) by 513 days.

(21) Appl. No.: 13/367,913

(22) Filed: Feb. 7, 2012

(65) Prior Publication Data
US 2012/0211669 A1 Aug. 23, 2012

(30) Foreign Application Priority Data

Feb. 17, 2011 (JP) ................................. 2011-031728

(51) Int. Cl.
| G21K 4/00 | (2006.01) |
| G01T 1/20 | (2006.01) |
| G01T 1/202 | (2006.01) |
| G03B 42/08 | (2006.01) |
| H01J 9/227 | (2006.01) |
| G01V 5/00 | (2006.01) |

(52) U.S. Cl.
CPC ............... *G01T 1/202* (2013.01); *G03B 42/08* (2013.01); *H01J 9/227* (2013.01); *G21K 2004/06* (2013.01); *G01V 5/0025* (2013.01); *G01V 5/0066* (2013.01)

(58) Field of Classification Search
CPC ....... G01T 1/20; G03B 42/08; G21K 2004/06
USPC .......................................... 250/370.11, 484.4
See application file for complete search history.

(56) References Cited

U.S. PATENT DOCUMENTS

| 6,781,131 | B2* | 8/2004 | Kusuyama et al. | ........... 250/368 |
| 7,265,371 | B2* | 9/2007 | Shoji et al. | ..................... 250/581 |
| 8,735,854 | B2* | 5/2014 | Sakai et al. | ................ 250/484.4 |
| 2006/0033030 | A1* | 2/2006 | Ito et al. | ................... 250/370.11 |
| 2008/0105832 | A1* | 5/2008 | Arimoto et al. | ............ 250/484.4 |
| 2012/0211661 | A1* | 8/2012 | Itaya et al. | ..................... 250/367 |

FOREIGN PATENT DOCUMENTS

| JP | 2002-116258 | 4/2002 |
| JP | 2003-066196 A | 3/2003 |
| JP | 2004-105518 | 4/2004 |
| JP | 2005-114556 | 4/2005 |
| JP | 2005-308582 | 4/2005 |

(Continued)

OTHER PUBLICATIONS

Office Action dated Aug. 29, 2014 issued by JPO for Patent Application No. JP2011-031728.

(Continued)

*Primary Examiner* — Casey Bryant
(74) *Attorney, Agent, or Firm* — Lucas & Mercanti, LLP

(57) ABSTRACT

Disclosed is a scintillator panel provided with on a support a phosphor layer comprising columnar crystals and a protective layer sequentially in this order, wherein degraded areas on lateral surfaces of columnar crystals at an end of the phosphor layer and produced by a cutting treatment account for not less than 0% and not more than 40% of an area of all of the side surfaces of the columnar crystals. A production method of the scintillator panel is also disclosed.

14 Claims, 5 Drawing Sheets

(56) References Cited

FOREIGN PATENT DOCUMENTS

| | | |
|---|---|---|
| JP | 2005-338067 | 12/2005 |
| JP | 2006-052986 A | 2/2006 |
| JP | 2008-139291 | 6/2008 |
| JP | 2008-151768 A | 7/2008 |
| JP | 2008-196854 A | 8/2008 |
| JP | 2008-213043 | 9/2008 |
| WO | WO2007/023670 A1 | 3/2007 |

OTHER PUBLICATIONS

Decision of Refusal dispatched Mar. 17, 2015 for the corresponding Japanese patent application No. 2011-031728 and English translation thereof.

* cited by examiner

SCINTILLATOR PANEL AND PRODUCTION METHOD THEREOF, FLAT PANEL DETECTOR AND PRODUCTION METHOD THEREOF

This application claims priority from Japanese Patent Application No. 2011-031728, filed on Feb. 17, 2011, which is incorporated hereinto by reference.

FIELD OF THE INVENTION

The present invention relates to a downsized scintillator panel with excellent moisture resistance and enhanced productivity and a production method of the same, and a flat panel detector by use of the same and a production method of the same.

BACKGROUND OF THE INVENTION

Flat panel type radiation detectors (also denoted simply as FPD), which have been developed as a digital radiation imaging technology capable of obtaining digital radiation image directly, include a scintillator system in which radiation is converted to a visible light through a phosphor such as $Gd_2O_2S$ or CsI, followed by conversion to an electric charge through photodiode, and a system of converting X-rays directly to an electric charge through an X-ray detecting element, as typified by Se. The present invention is related to a flat panel detector of the former scintillator system. Examples of a flat panel detector of a scintillator system include an FPD in which a scintillator panel is combined with a photoelectric conversion device of a thin layer transistor (TFT) and a charge coupled device (CCD), as described in JP 2005-114556 A.

Recently, there were commercialized, flat panel detectors using CCD, CMOS or the like, for use in industrial nondestructive examination or for dental to be inserted in the mouth. Specifically development for use in dental diagnosis has been remarkable, resulting in replacement with film in a broad range including a small device for use in the mouth, panoramic photographing and cephalometric analysis (as described in, for example, JP 2004-105518 A). As a result of such a variety of sizes or forms, enlargement of effective image area or flexibility of are required for SA scintillator panels.

A phosphor capable of converting radiation to visible light requires use of a phosphor exhibiting enhanced emission efficiency to achieve an enhanced SN ratio even when photographed at a relatively low dosage. The emission efficiency of a scintillator panel is generally dependent on the phosphor layer thickness or X-ray absorption coefficient. However, an increased thickness of a phosphor layer causes scattering of emitted light within the phosphor layer, leading to lowering of image sharpness. Accordingly, defining sharpness required for image quality determines a specific layer thickness.

Specifically, cesium iodide (CsI) exhibits enhanced conversion efficiency of X-rays to visible light and can easily form a phosphor of a columnar crystal structure through vapor deposition, whereby scattering of emitted light within a crystal is inhibited through a light guide effect, rendering it feasible to increase the thickness of a phosphor layer. However, the CsI alone exhibits lowered emission efficiency, so that a mixture of CsI and sodium iodide (NaI) at an appropriate ratio is deposited on a support in the form of a sodium activated cesium iodide (CsI:Na) through vapor deposition, as described in, for example, JP 54-035060 B. Alternatively, recently, a mixture of CsI and thallium iodide (TlI) at an appropriate ratio is deposited on a support in the form of a thallium activated cesium iodide (CsI:Tl) through vapor deposition, followed by annealing to achieve enhanced visible light conversion efficiency, which is employed as an X ray phosphor.

A phosphor comprising CsI as a parent material exhibits deliquescence and exhibits such a defect of characteristics being deteriorated with aging. Accordingly, there was proposed formation of a moisture-proofing protective layer on the surface of a phosphor layer employing CsI to inhibit such deterioration with aging. For instance, there were disclosed a technique of covering the upper portion and the side portions of a phosphor layer and the circumference of a support with a polyxylylene resin (as described in, for example, JP 2004-105518 A); and a technique of covering at least the opposite surface of the side opposed to a support and the side surface with a transparent resin film exhibiting a moisture permeability of less than $1.2 \text{ g/m}^2 \cdot \text{day}$ (as described in, for example, JP 2005-308582 A). These protective layers can achieve enhanced moisture resistance.

Durability of such a moisture-resistant protective layer leads to durability of a scintillator layer as such and there are known a technique of covering the overall surface of a support together with the scintillator with poly(p-xylylene), as described in, for example, JP 2002-116258 A, a technique of providing a concave-convex surface to a support to prevent poly(p-xylylene) from peeling (as described in, for example, JP 2005-338067 A), and, in case of a transparent resin film, a technique of melting the edge portions of a phosphor to prevent the interior of the film from being damaged by the phosphor edge, as described in, for example, JP2008-139291 A. However, coverage of the overall surface or providing a concave-convex to a support results in increased cost or makes production prove complicated, leading to increased load, which is not satisfactory.

As a method of producing a radiation image conversion plate comprising a support and a phosphor layer, there is known a method of cutting a radiation image conversion plate by exposing a phosphor layer (on the opposite side of a support) to a laser light (as described in, for example, JP 2008-213043 A). This is not a production method of a scintillator panel but application of this method to a scintillator panel resulted in problems such that adhesion of a protective layer to a phosphor layer was lowered, leading to deterioration in moisture resistance.

SUMMARY OF THE INVENTION

The present invention has come into being and it is an object of the present invention to provide a downsized scintillator panel with excellent moisture resistance and enhanced productivity and a production method thereof, and a flat panel detector by use of the scintillator panel and a production method thereof.

The foregoing object of the present invention has been accomplished by the following constitution.

One aspect of the present invention is directed to a scintillator panel provided with on a support a phosphor layer comprised of columnar crystals and a protective layer sequentially in this order, wherein degraded areas on the lateral surfaces of columnar crystals at an end of the phosphor layer and produced by a cutting treatment accounts for not less than 0% and not more than 40% of an area of all of the side surfaces of the columnar crystals.

Another aspect of the present invention is directed to a production method of a scintillator panel provided with on a support a phosphor layer comprised of columnar crystals and a protective layer sequentially in this order, the method comprising:

forming the phosphor layer on the support, and exposing a reverse side of the support on which the phosphor layer is not provided to a laser to cut the support, wherein degraded areas on the lateral surfaces of columnar crystals at an end of the phosphor layer and produced by a cutting treatment accounts for not less than 0% and not more than 40% of an area of all of the side surfaces of columnar crystals.

Another aspect of the present invention is directed to a flat panel detector comprising scintillator panel, as claimed in 1 and a planar light receiving element having plural picture elements which are arranged two-dimensionally, wherein the scintillator panel and the planar light receiving element are optically coupled.

9. The flat panel detector, as claimed in 8, wherein the planar light receiving element is opposed to a phosphor layer and a surface of the phosphor layer is subjected to a flattening treatment 10. The flat panel detector, as claimed in 8, wherein the support is a substrate having the planar light receiving element.

Another aspect of the present invention is directed to a production method of a flat panel detector comprising:

forming the phosphor layer on the planar light receiving element and then, exposing a reverse side of the substrate on which the phosphor layer is not provided to a laser to cut the substrate.

According to the present invention, there were provided a downsized scintillator panel with excellent moisture resistance and enhanced productivity, and a production method of the scintillator panel, and a flat panel detector by use of the scintillator panel and a production method of the flat panel detector.

DETAILED DESCRIPTION OF THE INVENTION

In the following, there will be further described the embodiments of the present invention.

In the present invention, not less than 0% and not more than 40% of an area of all of the lateral surfaces of columnar crystals located at the end of a phosphor layer is accounted for by an area of degraded portions produced by a cutting treatment on the lateral surfaces of columnar crystals, whereby areas which have been melted or deformed by the cutting treatment are suppressed to leave, as much as possible, the columnar structure formed when forming a phosphor layer.

It was found that when an area of degraded portions produced by a cutting treatment accounted for not less than 0% and not more than 40% of an area of all of the side surfaces of columnar crystals, roughness of the side surface of a phosphor layer at the time when forming a phosphor layer is maintained, achieving enhanced adhesion of a protective layer. The area of degraded portions preferably accounts for not less than 0% and not more than 30%. In a laser cutting treatment, it is preferred that not only a support is subjected to a laser cutting treatment but a phosphor layer also has a starting point of cutting. Accordingly, the area of degraded portions more preferably accounts for not less than 1% and not more than 30%.

In the present invention, a scintillator panel having a phosphor layer formed on a support is cut to a prescribed size by a cutting treatment. The cutting treatment gives rise to a region on the end surface of the support in which the phosphor layer is not formed, that is, the phosphor layer is absent, and when such a region is within 0.5 mm from the end of the support, enhanced image quality can be achieved. The area in which a phosphor layer is not formed on the support is preferably within 0.2 mm from the end of the support, and more preferably within 0.1 mm. Thereby, an image effective area can be broadened, compared to the case when a support is cut to such a proscribed size and a phosphor layer is formed on the cut support.

In cases when a support to form a phosphor layer is the same as a substrate having a photoelectric conversion element, wiring or the like is installed so that a phosphor layer may not formed on the entire end portion of the support. In such a case, the foregoing phosphor forming region is met in a portion not having a function of converting light outputted from photoelectric conversion to electric energy and constitution needed for function of outputting signals based on the obtained electric energy.

Figure 6:
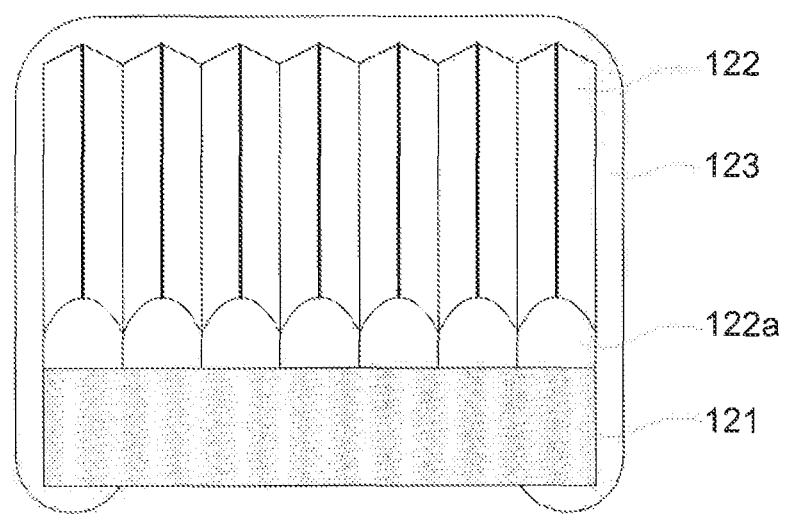
FIG. 6 shows degraded areas which are produced on the side surfaces of columnar crystals located at the end portion of a phosphor layer.

FIG. 6 shows a degraded area which is produced by a laser cutting treatment on the side surfaces of columnar crystals located at the end portion of a phosphor layer. A phosphor layer 122 is firmed on a support 121 and after conducting a laser cutting treatment, a degraded area 122a is formed by a laser cutting treatment on the lateral surfaces of columnar crystals at the end portion of the phosphor layer. To achieve a degraded area of not less than 0% and not more than 40%, after forming the phosphor layer 122 on the support 121, cutting the support 121 is performed by using a laser from the reverse side on which the phosphor layer 122 is not formed; namely, the opposite side of the support to the phosphor layer is exposed to the laser. When only the support is cut from the reverse side with controlling a laser strength or an exposure time, the phosphor layer comprised of columnar crystals can be divided along the wall surfaces of columnar crystals even when a laser beam does not come and cutting is completed and no degraded area is produced (that is, the degraded area being 0%). In cases when the laser intensity or laser exposure time is increased, a laser beam reaches the phosphor layer deeply, resulting in increased degraded areas. When exposure to a laser is performed from the phosphor layer side, a degraded area accounts for nearly 100%. In FIG. 6, after cutting, a protective layer 123 is formed, except for a part of the support.

The degraded area which has been produced by a laser cutting treatment can be determined in such a manner that the side surface of a phosphor layer is observed by a confocal laser microscope and the ratio of a degraded area produced by a laser treatment to the total surface area of the side surface of the phosphor layer are determined with an image processing software.

A laser treatment applicable in the present invention is not specifically limited but may be any which is usable for cutting a scintillator panel. Examples of a laser usable in the present invention include an infrared laser of Nd:YAG, a semiconductor, Nd:glass, Nd:YLF, Nd:BEL, Nd:YVO$_4$, LNP, Ti:saphire, alexandrite, Co—MgF$_2$, Cr-GSGG, emerald, perovskite, Er—YLF, or Er-glass; a visible laser of ruby, He—Ne, CO$_2$, Ar ion, He—Cd, Cu, Au, Sr, Kr ion, Ne ion, Xe ion, CO, a hydrogen halide, O$_2$—I, Dye, or a secondary or tertiary harmonic wave of YAG; and an ultraviolet laser of ArF excimer, KrF excimer, XeF excimer, ArCl excimer, KrCl excimer, XeCl excimer, N$_2$, Au, or a quaternary harmonic wave of Nd:YAG. Of these, an ultraviolet laser is preferred.

An ultraviolet laser usable in the present invention is preferably one of a wavelength of about 266 nm or so. Such a laser processes a material to be processed through a thermal action and makes it feasible to dissociate a molecular bond such as C—H bond or C—C bond with an organic material. Namely, a phosphor layer is cut through a thermal action and a support is cut through dissociation of a molecular bond. Consequently, since the phosphor layer is cut through a thermal action and the support is cut through dissociation of a molecular bond, which prevents cracking of a crystal at the cutting portion.

Figure 5:
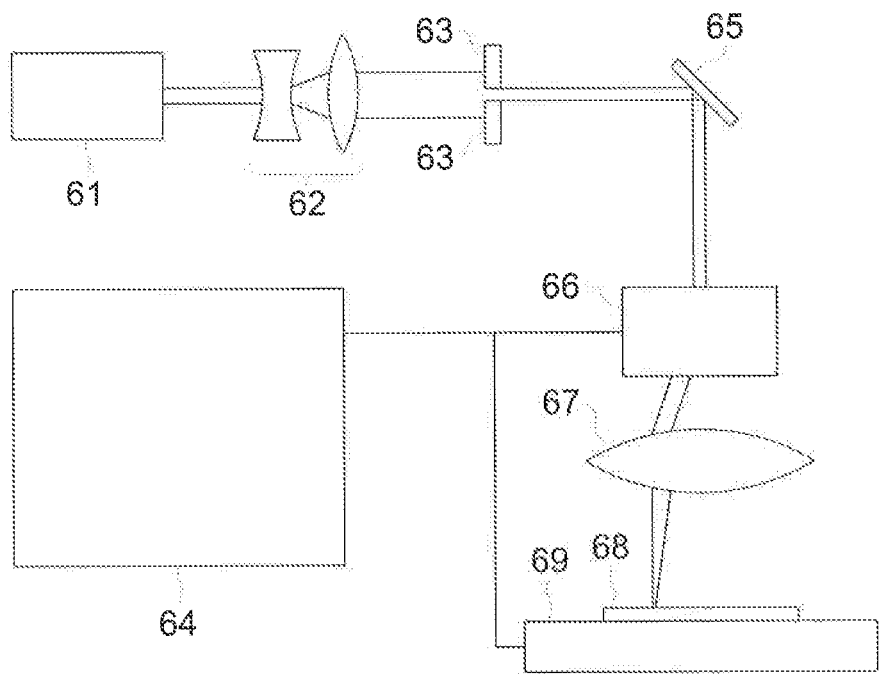
FIG. 5 is a schematic view showing an example of cutting a scintillator panel of the invention with a laser light.

FIG. 5 is a schematic view showing an example of cutting a scintillator panel of the invention with a laser light. A quaternary harmonic wave (at a wavelength of 266 nm) of a Nd:YAG laser is radiated at a pulse energy of 0.1 mJ/pulse and a pulse width of 50 ns from a laser light source, for example, a NdYAG laser oscillator including a wavelength conversion unit. Further, there may be employed a basic wave of a solid laser of YAG, YLF, or YVO$_4$ or its harmonic wave, or a laser light of a CO$_2$ laser or the like in accordance with the kind of a material to be processed. A laser beam expands its beam diameter, is allowed to transmit through an expander 62 and is ejected as a parallel light, reflected at a reflection mirror 65 and enters a galvanoscanner 66. The galvanoscanner 66 is constituted of two swinging reflection mirrors and causes the laser beam to be scanned in the two-dimensional direction. The laser beam which has left the galvanoscanner 66 enters through fθ lens 67 a phosphor plate 68 as an object to be processed, placed on an XY stage 69 to perform cutting. The numerals 63 and 64 indicate a mask and a control section, respectively.

Laser dicing may be chosen, depending on a support. Laser dicing refers to a cutting method which employs an optical damage phenomenon occurred when extremely enhancing the laser light intensity, so-called multi-photon absorption, while focusing a laser light onto the inside of an object to be processed, which becomes a starting point for division. Recently, laser dicing has been employed for cutting of silicon wafers.

In the present invention, a protective layer may employ any one which is known in the art and capable of being adhered to a phosphor layer, but it is preferred to form a poly(p-xylylene) film between columnar crystals and on the surface thereof through a CVD method (gas phase chemical growth method). In the present invention, functions of a poly(p-xylylene) film are moisture-proofing for a phosphor layer exhibiting deliquescence and prevention of corrosion caused by contact of a scintillator panel with a light receiving element, and the film thickness is preferably not less than 2 μm and not more than 20 μm. A film thickness of not more than 20 μm can achieve enhanced sharpness of a detector. It was a concern that such a thin protective layer caused frilling of the circumference when set on a planar light receiving element or treated in the production process. However, it was proved that concern of frilling was remarkably reduced in the present invention.

A hot-melt resin may be used for a protective layer. Such a hot-melt resin can also achieve adhesion to a scintillator panel and a planar light-receiving element. A hot-melt resin preferably composed of a polyolefin resin, polyester resin or polyamide resin as a main component but is not limited to these.

In the present invention, a support preferably employs a resin. Such a resin used for a support requires durability at high temperatures during vapor deposition, and a polyimide film or polyethylene naphthalate film is preferred, which exhibits enhanced heat-stability and surface quality, but the support is not limited to these. A flexible 50 to 250 μm thick film which exhibits reduced X-ray absorptivity is preferred.

In the present invention, after forming a phosphor layer and a protective layer, the protective layer is prevented from frilling even when allowing a scintillator panel to be curved during adhesion to a light receiving element or even when employing a flexible light receiving element such as an organic TFT or the like.

In the present invention, no end treatment is required even when employing a support such as amorphous carbon, FOP or Al which is low-affinitive to a protective layer and has been considered that it was preferable to be subjected to an end treatment such as providing a concave-convex surface to a support to prevent peeling of the protective layer.

In the present invention, even when forming a phosphor layer directly on a semiconductor substrate as a light receiving element and further thereon a protective layer, delamination of the light receiving element and a protective layer can be prevented.

Another advantage of the present invention is related to combination with a flattening treatment of the phosphor layer. Problems such as foreign material deposition or deposited protrusions being created are often created in a phosphor layer formed by a process of vapor deposition. To overcome such problems, there are known flattening techniques by pressure, pressure accompanied with heat, cutting or grinding. Flattening a phosphor layer results in enhanced adhesion to a light receiving element (as described in, for example, JP 3398406 B). On the other hand, such a flattening treatment tends to result in a lowering of adhesion to a protective layer; however, the present invention enables to employ such a flattening technique.

In the following, there will be described constituent features of the present invention.

Constitution of Scintillator Panel:

The scintillator panel of the present invention comprises on a support a phosphor layer formed of columnar crystals and a protective layer for the phosphor layer, and preferably, a sublayer is provided between the support and the phosphor layer. A reflection layer may be provided on the support and there may also be constitution of a reflection layer, a sublayer and a phosphor layer. There will be described below the individual constituent layers and constituent elements.

Phosphor Layer:

The phosphor layer related to the present invention features a phosphor layer comprised of columnar phosphor crystals. After completing vapor deposition, the formed phosphor is cut to a prescribed size and almost the entire surface of a support is a phosphor layer forming area.

A variety of commonly known phosphor materials can be used for a material forming a phosphor layer but cesium iodide (CsI) is preferable which exhibits a relatively high conversion factor of X-rays to visible light and can be easily formed, by a process of vapor deposition, a columnar crystal structure of a phosphor, which is capable of inhibiting scattering of emitted light within a crystal through an optical guiding effect and increasing the thickness of a phosphor layer.

However, CsI alone results in reduced emission efficiency, so that various activators are added thereto. For example, CsI is mixed with sodium iodide (NaI) at an appropriate ratio, as described in JP 54-035060 B. An activator material such as thallium (Tl), europium (Eu), indium (In), lithium (Li), potassium (K), rubidium (Rb) or sodium (Na) is included in CsI by a process of vapor deposition, as described in, for example, JP 2001-059899 A. In the present invention, an activator of sodium (Na), thallium (Tl) or europium (Eu) is preferred and thallium (Tl) is more preferred.

In the present invention, it is preferred to use, as raw materials, cesium iodide and an additive containing at least one thallium compound. Namely, thallium-activated cesium iodide (CsI:Tl), which exhibits a broad emission wavelengths from 400 to 750 nm, is preferable. Such an additive containing at least one thallium compound may use various thallium compounds (that is, a compound having oxidation number of +I or +III). In the present invention, a preferable thallium compound is thallium iodide (TlI), thallium bromide (TlBr), thallium chloride (TlCl) or thallium fluoride (TlF, $TlF_3$).

The melting point of a thallium compound related to the present invention is preferably within the range of 400 to 700° C. A melting point higher than 700° C. results in uneven distribution of an additive within columnar crystals, leading to a lowering of emission efficiency. In the present invention, the melting point refers to a melting point under ordinary temperature and pressure.

The content of an additive in the phosphor layer related to the present invention, which is desirably optimized in accordance with its purpose or performance, is preferably from 0.001 to 50 mol % of the content of cesium iodide, and more preferably from 0.1 to 10.0 mol %. An additive content of not less than 0.001 mol % results in enhanced emission luminance, as compared to luminance obtained by cesium iodide alone and is preferable to achieve the intended emission luminance. A content of not more than 50 mol %, which enables to maintain characteristics or functions of cesium iodide, is preferable.

The thickness of a phosphor layer is preferably from 50 to 600 μm, and in cases when using a resin support, the thickness is preferably from 50 to 500 μm in consideration of damage during cutting. Further, the thickness is more preferably from 120 to 400 μm for use in medical care to balance luminance and sharpness.

In the present invention, a phosphor layer is formed on a support by a process of vapor deposition of raw materials of a phosphor (scintillator) and then cut to a prescribed size. Thereby, the image effective area of a scintillator panel is broadened and becomes suitable for a detector having a small light-receiving area such as a detector for use in a human mouth or a flat panel detector of a line sensor. It is also feasible to conduct cutting by laser dicing after vapor deposition on a silicon wafer. It is unnecessary to conduct vapor deposition onto the individual supports. Vapor deposition is conducted at a maximum size which can be prepared by a vapor deposition apparatus and cutting to a desired size can be performed, which is advantageous in terms of production efficiency and delivery date.

Reflection Layer:

In the present invention, it is preferred to provide a reflection layer on a support, whereby emitted light from a phosphor layer is reflected, leading to enhanced light extraction efficiency. Such a reflection layer is formed preferably with a material containing at least an element selected from the group consisting of Al, Ag, Cr, Cu, Ni, Ti, Mg, Rh, Pt and Au. It is specifically preferred to use a thin film containing the foregoing element as a main component, for example, Ag film and Al film. Such a thin film may be in the form of two or more layers. The thickness of a reflection layer is preferably from 0.005 to 0.3 μm in terms of emission extraction efficiency, and more preferably from 0.01 to 0.2 μm.

In cases when a substrate is a light receiving element substrate, it is preferable to provide a reflection layer after providing a phosphor layer on the light receiving element substrate. In that case, it is preferred to provide an intermediate layer between the phosphor layer and the reflection layer to prevent corrosion caused by contact of the reflection layer with the phosphor layer.

An intermediate layer may be a member for effective employment of light or may play a role of a protective layer.

A reflection layer may use, as a main component, a white pigment selected from the group consisting of $TiO_2$ (anatase type, rutile type) MgO, $PbCO_3.Pb(OH)_2BaSO_4, Al_2O_3$, M(II) FX (in which M(II) is an atom selected from the group of Ba, Sr and Ca, and X is Cl atom or Br atom), $CaCO_3$, ZnO, $Sb_2O_3$, $SiO_2$, $ZrO_2$, lithopone ($BaSO_4.ZnS$), magnesium silicate, basic silicon sulfate, basic lead phosphate, and aluminum silicate.

Sublayer:

In the present invention, it is preferable to provide a sublayer between a support and a phosphor layer, or between a reflection layer and a phosphor layer. Such a sublayer may be formed by forming a layer with poly(p-xylylene) through a chemical vapor deposition method (CVD method), or a method using a polymeric binding material (binder), but the method using a polymeric binding material (binder) is preferred in terms of adhesion. The thickness of a sublayer is preferably from 0.5 to 4 μm. A thickness of not more than 4 μm lessens light scattering within a sublayer, leading to enhanced sharpness. In the following, there will be described constituents of a sublayer.

Polymer Binder:

A sublayer related to the present invention is formed preferably by coating a polymeric binder (hereinafter, also denoted as a binder), followed by coating and drying. Specific examples of a polymeric binder include polyurethane, vinyl chloride copolymer, poly[(vinyl chloride)-co-(vinyl acetate)], poly[(vinyl chloride)-co-(vinylidene chloride)], poly[(vinyl chloride)-co-acrylonitrile], poly(butadiene-co-acrylonitrile), polyamide resin, poly(vinyl butyral), polyester, cellulose derivatives (e.g., nitrocellulose), Poly(styrene-co-butadiene), various synthetic rubber resins, a phenol resin, epoxy resin, urea resin, melamine resin, phenoxy resin, silicone resin, acryl resin, and urea formaldehyde resin. Of these, an acryl resin, polyurethane resin, polyester resin, vinyl chloride copolymer, poly(vinyl butyral) and nitrocellulose are preferably used.

A polymeric binder such as polyurethane, polyester, vinyl chloride copolymer poly(vinyl butyral) or nitrocellulose is also preferred in terms of adhesiveness to the phosphor layer. A polymer exhibiting a glass transition temperature (Tg) of 30 to 100° C. is also preferred in terms of adhesion between deposited crystals and a support. In view thereof, an acryl resin, or polyester resin is preferred.

Specific examples of a solvent used for preparation of a sublayer include a lower alcohol such as methanol, ethanol, n-propanol or n-butanol; a chlorine-containing hydrocarbon such as methylene chloride or ethylene chloride; a ketone such as acetone, methyl ethyl ketone, or methyl isobutyl ketone; an aromatic or alicyclic compound such as toluene, benzene, xylene, cyclohexane or cyclohexanone; an ester of a lower fatty acid and a lower alcohol such as methyl acetate, ethyl acetate, or butyl acetate; dioxane and an ether such as ethylene glycol monomethyl ether or ethylene glycol monoethyl ether.

The sublayer related to the present invention may contain a pigment or dye to inhibit scattering of light emitted from a phosphor (scintillator) or achieve an enhancement of sharpness or the like.

Protective Layer:

A protective layer can be formed by using various kinds of materials. For instance, a poly(p-xylylene) membrane is formed by a CVD method. Specifically, a poly(p-xylylene) membrane is formed on the surfaces of a phosphor (scintillator) and a support to form a protective layer.

The thickness of a poly-p-xylylene membrane is preferably not less than 2 μm and not more than 20 μm, and the thickness of an adhesive layer in cases when adhered to a light receiving element is preferably not less than 10 μm and not more than 28 μm. Namely, the thickness of an adhesive layer is preferably not less than 10 μm to secure adhesion force but a total thickness of a poly-p-xylylene and adhesive layer of not more than 30 μm results in increased diffusion of light emitted from a scintillator in the space between a light receiving element and a scintillator panel, preventing a flat panel detector from a lowering of sharpness.

In another embodiment of a protective layer, a hot-melt resin may be used on a phosphor layer. Such a hot-melt resin can also adhere a scintillator panel onto the surface of a planar light receiving element. A hot-melt resin which is mainly composed of a polyolefin, polyester or polyamide resin is suitable but is not limited to those.

A hot-melt resin referred to in the present invention contains no water or solvent, and is in the form of a solid at room temperature and an adhesive resin composed of an nonvolatile thermoplastic material. The resin melts when the resin temperature rises and is solidified when the resin temperature is lowered. The resin exhibits adhesiveness is maintained in the state of being thermally melted and becomes a solid state at ordinary temperature, exhibiting no adhesiveness. A polyolefin resin is preferred in terms of light transmittance.

A melt initiation temperature of a hot-melt resin is preferably not less than 60° C. and not more than 150° C. The surface of a planar light receiving element such as TFT sometimes reaches approximately 60° C. when continuously used and a melt initiation temperature higher than 60° C. is preferable in terms of prevention of peeling of a scintillator panel from a flat light receiving element. When performing adhesion of the surface of a planar light receiving element to a scintillator panel, heating at a temperature of not more than 150° C. is preferred, whereby damage of the planar light receiving element can be inhibited. The melt initiation temperature of a hot-melt resin can be controlled by addition of a plasticizer.

A protective layer is prepared with a hot-melt resin in such a manner, for example, as described below. A peeling-sheet coated with a peeling agent is prepared and a hot-melt resin is coated on the peeling sheet. The hot-melt resin is placed onto the phosphor layer surface of a scintillator panel and adhered, while being compressed by a heated roller, and after being cooled, the peeling sheet is removal.

Alternatively, a hot-melt resin coated sheet is placed on the phosphor layer surface, on and below which resin films are placed and the circumferences of the upper and lower films are sealed under reduced pressure, followed by being heated under atmospheric pressure.

The latter method is more preferable, in which a dry-laminated film of a sealant film and polyethylene terephthalate film is suitable as rein film and uniform adhesion pressure is applied to the entire surface of the phosphor layer at atmospheric pressure.

Taking into account photoelectric efficiency and emission wavelength of a phosphor (scintillator), the light transmittance of a protective layer is preferably not less than 70% at 550 nm.

Support:

A support of the scintillator panel of the present invention may employ various materials, such as (1) carbon fiber reinforced plastics (CFRP), (2) carbon board (obtained by solidifying charcoal or paper through carbonization), (3) carbon support (graphite support), (4) plastic support, (5) glass support, (6) various metal supports, and (7) one in which a support as described above is laminated and sandwiched with an expanded plastic.

When producing a scintillator panel by a conventional vapor deposition process, a support requires heat resistance, so that a phosphor layer was generally deposited on a rigid support. The thickness of such a rigid support is preferably not less than 0.3 mm and not more than 1.0 mm, and it is preferred to employ CFRP, amorphous carbon, Al, or FOP in terms of X rays. There are also feasible a Si substrate on which photodiodes are two-dimensionally disposed to form a photo-response section as a light receiving area, and a glass substrate on which photodiodes performing photoelectric conversion, Thin Film Transistors (TFT) are arranged in areas divided by plural scanning lines and plural signal lines, and which is designed so that a source electrode of TFT, a gate electrode and a drain electrode are connected to the photodiode, a scanning line and a signal line, respectively.

The support usable in the present invention may employ various kinds of materials. There are usable resin films (plastic films) such as cellulose acetate film, polyester film, polyethylene terephthalate (PET) film, polyethylene naphthalate (PEN), polyamide polyimide film, triacetate film, polycarbonate film and carbon fiber reinforced resin sheet. A polymer film containing a polyimide or polyethylene naphthalate is specifically suitable when forming phosphor columnar crystals with a raw material of cesium iodide by a process of vapor phase deposition.

Such a resin film as a support preferably is 50 to 250 μm thick and flexible.

Herein, the flexible support refers to a support exhibiting an elastic modulus at 120° C. (also denoted as E120) of 1000 to 6000 N/mm$^2$. Such a substrate preferably is a polymer film containing polyimide or polyethylene naphthalate.

In the region showing a linear relationship between strain and corresponding stress which is measured by using a tensile strength tester based on JIS C 2318, the elastic modulus is calculated as the slope of the straight portion of the stress-stain curve, that is, stain divided by stress, which is also referred to as a Young's modulus. In the present invention, such a Young's modulus is also defined as the elastic modulus.

The first support (substrate) used in the invention preferably exhibits an elastic modulus at 120° C. (E120) of 1000 to 6000 N/mm$^2$, and more preferably 1200 to 5000 N/mm$^2$.

Specific examples include polymer film comprised of polyethylene naphthalate (E120=4100 N/mm$^2$), polyethylene terephthalate (E120=1500 N/mm$^2$), polybutylene naphthalate (E120=1600 N/mm$^2$), polycarbonate (E120=1700 N/mm$^2$), syndiotactic polystyrene (E120=2200 N/mm$^2$), polyether imide (E120=1900 N/mm$^2$), polyimide (E120=1200 N/mm$^2$), polyacrylate (E120=1700 N/mm$^2$), polysulfone (E120=1800 N/mm$^2$) or polyether sulfone (E120=1700 N/mm$^2$).

These may be used singly or mixedly, or laminated. Of these polymer films, a polymer film comprising polyimide or polyethylene naphthalate is preferred.

Adhesion of the scintillator panel to the surface of a planar light receiving element is often affected by deformation or warpage during deposition, rendering it difficult to achieve a uniform image quality characteristic within the light receiving surface of a light receiving element. In such a case, a 50-500 µm thick polymer film is used as the support (substrate), whereby the scintillator panel is deformed with being fitted to the form of the surface of a planar light receiving element, leading to uniform sharpness over all of the light-receiving surface of the flat panel detector.

Production Method of Flat Panel Detector:

There will be described a production method of a typical flat panel detector related to the present invention with reference to the drawings.

Figure 1A:
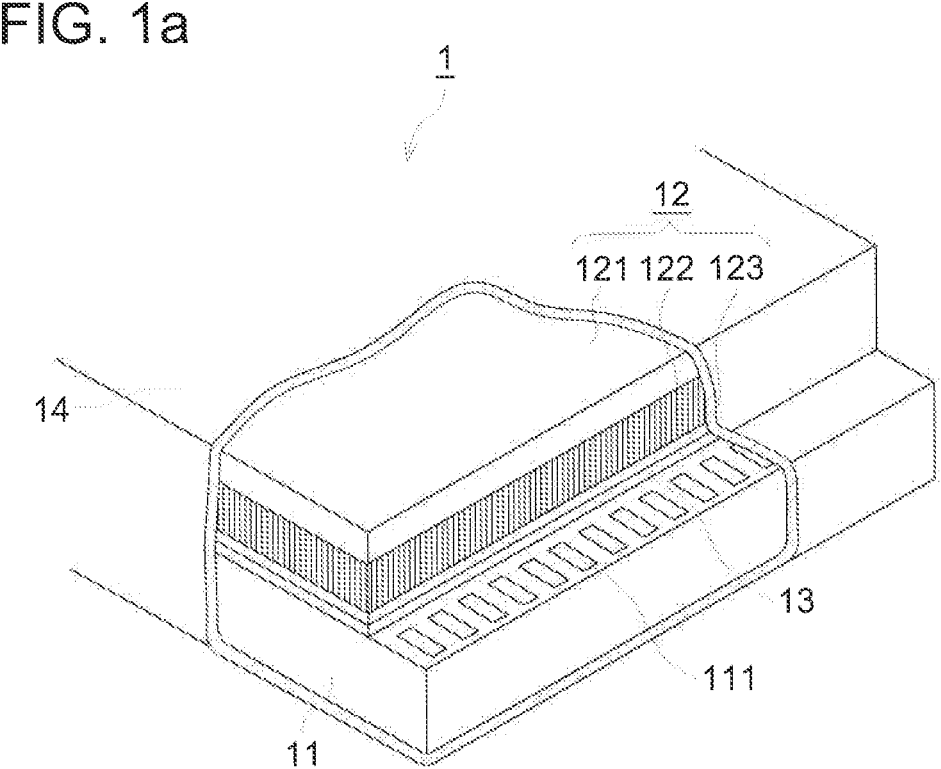
FIG. 1a is a perspective view showing schematic constitution of a flat panel detector.
Figure 1B:
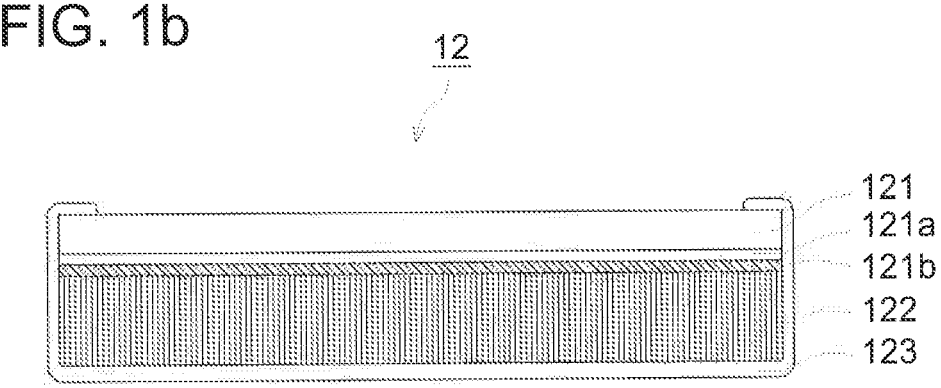
FIG. 1b is a sectional view of a scintillator panel of the present invention.

FIG. 1a is a perspective view showing schematic constitution of a flat panel detector 1. A scintillator panel is adhered to a light receiving element 11 through an adhesion layer 13. A support 121 and a phosphor layer 122 have the same size. There are coupled the entire surface of a light receiving picture element section other than a signal extraction section 111 and a portion of a phosphor layer 122. So as to be easily viewable, in FIG. 1a, a protective layer 123 is removed from the side face of the phosphor layer 122 and a part of the support 121, but as shown in FIG. 1b, the protective layer 123 is really formed on the side face of the phosphor layer 122 and a part of the support 121. The entire flat panel detector is sealed with an enclosure 14.

FIG. 1b is a sectional view of a scintillator panel, in which the support 121, a reflection layer 121a, a sublayer 121b, the phosphor layer 122 and the protective layer 123 are provided in this order. It is preferable to provide the reflection layer 121a, and the sublayer 121b, which is not necessarily provided.

Cutting Method of Scintillator Panel:

There will be described a typical example of the cutting method of a scintillator plate related to the present invention with reference to the drawings.

Figure 2A:
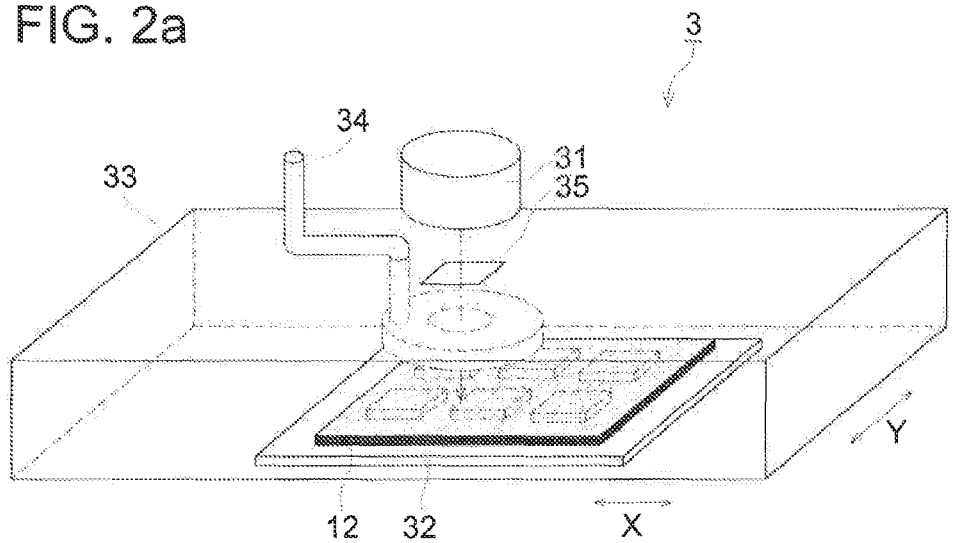
FIG. 2a is a perspective view of a cutting apparatus used in the cutting stage and FIG. 2b is a plan view showing plural scintillator panels cut out by cutting.

FIG. 2a shows an example of laser cutting of a scintillator panel 12 which is not provided with a protective layer.

A laser cutting apparatus 3 is provided with a purging room 33 formed in a box shape. The purge room 33 has an internally closed space so that dust or the like suspended in the external space does not enter the internal space. The interior of the purge room 33 preferably is under an atmosphere of low humidity. There is provided a translucent window 35 to transmit a laser light on the upper surface of the purge room 33. There is also provided a discharging tube 34 to introduce suspended materials such as dust to the outside of the purge room.

The scintillator panel 12 is placed on a support board 32, while the phosphor layer (122) being downward and is adsorptively retained. Accordingly, the scintillator panel 12 is retained in a phosphor layer-downward fashion.

The scintillator panel 12 placed on the support board 32 is positioned under a laser exposure section of a laser generator 31 by a support board transfer means (not shown in the drawing). The scintillator panel 12 is exposed to a laser light ejected from the laser generator 31 under the exposure condition of YAG-UV (yttrium/aluminum/garnet crystal, 266 nm wavelength), at a pulse laser of 5000 Hz frequency and 20 µm beam diameter and an output of 300 mW. Cutting is conducted, while moving the scintillator panel 12 by the support board transfer means (not shown in the drawing).

Figure 2B:
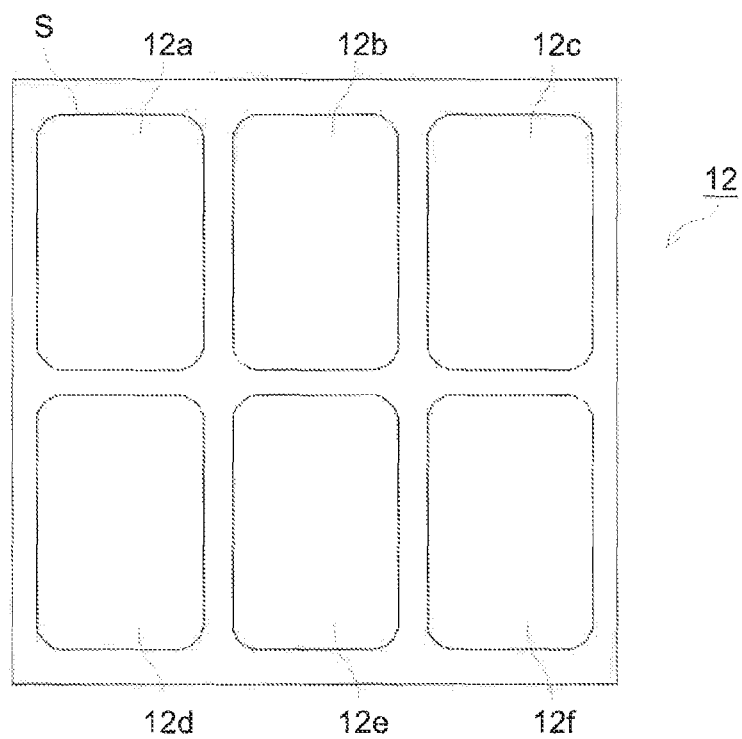

FIG. 2b shows an example of plural scintillator panels cut by lasers. Namely, scintillator panels 12a, 12b, 12c, 12d, 12e and 12f are cut from the scintillator panel 12.

Vapor Deposition Method of Scintillator Panel:

There will be described a typical example of a vapor deposition method of a scintillator panel related to the present invention with reference to the drawings.

Figure 3:
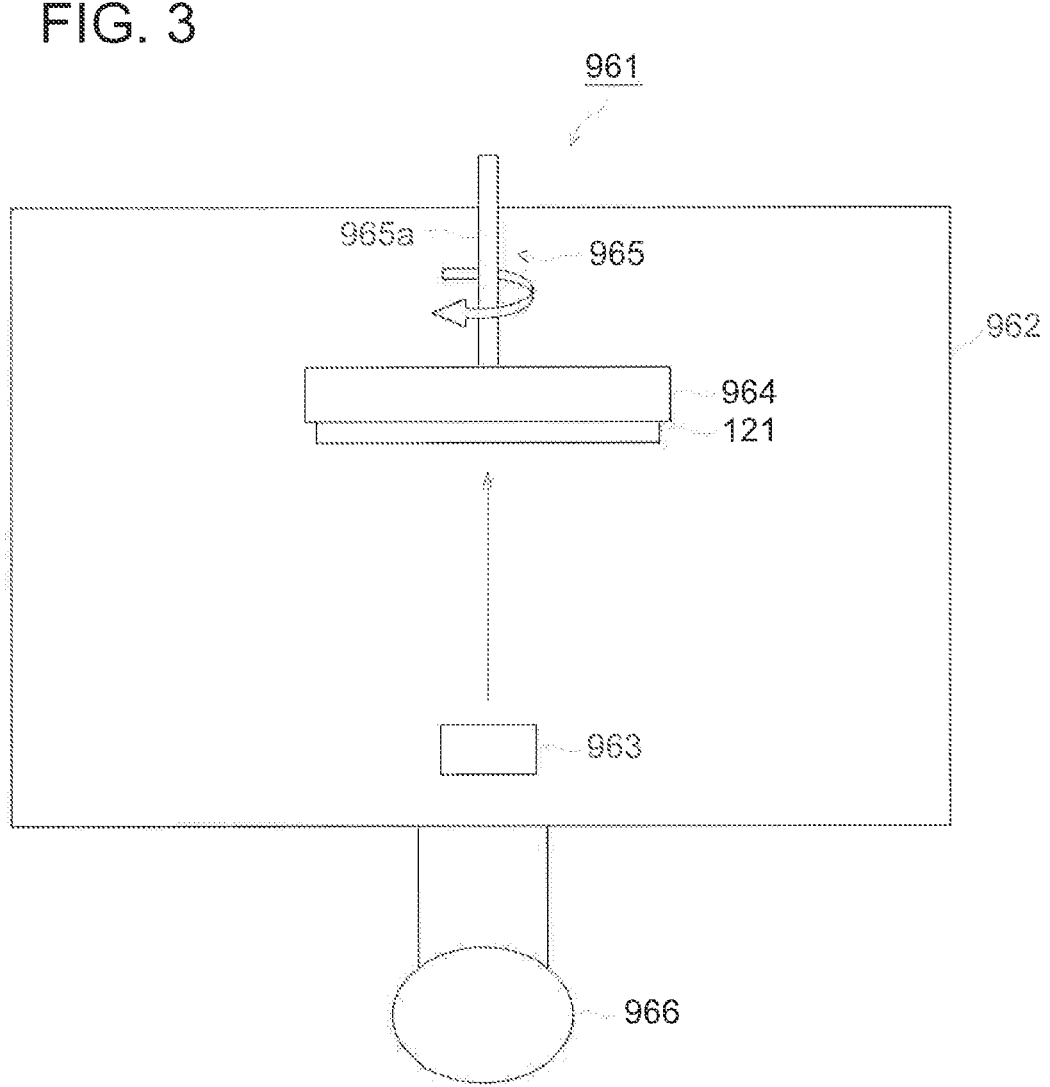
FIG. 3 is a schematic sectional view of an apparatus used for formation of a phosphor layer.

Vapor Deposition Apparatus:

As shown in FIG. 3, a vapor deposition apparatus 961 is provided with a box type evacuation vessel 962 and a boat 963 for use in vacuum deposition is disposed within the vacuum vessel 962. The boat 963 is a member filled with an evaporation source and electrodes are connected to the boat 963 so that when an electric current is applied through the electrodes, the boat generates heat through the Joule heat phenomenon. In production of the scintillator panel 12, the boat 963 is filled with a mixture of cesium iodide and an activator compound and application of an electric current to the boat causes the mixture to be heated and vaporized.

A filling member may be an aluminum crucible wound with a heater or a refractory metal heater may be applied.

A holder 964 to hold the support 121 is disposed within the evacuation vessel 962 and above the boat 963. The holder 964 is provided with a heater (not shown in the drawing) and operating the heater can heat the support 121 held by the holder. Heating the support 121 makes it feasible to separate or remove material adhered to the surface of the support 121, inhibit formation of impurities between the support 121 and the phosphor layer, strengthen adhesion of the support 121 onto the phosphor layer 122 or control layer quality of the phosphor layer 122 formed on the support 121.

A rotation mechanism 965 to rotate the holder 964 is applied to the holder. The rotation mechanism is constituted of a rotation shaft 965a connected to the holder 964 and a motor (not shown in the drawing) as a driving source. Driving the motor rotates the rotation shaft 965a and thereby, the holder 964 can be rotated, while being opposed to the boat 963.

The vapor deposition apparatus 961 is provided with a vacuum pump 966 used for the vacuum vessel 962. The vacuum pump evacuates the interior of the vacuum vessel 962 to allow gas to be introduced into the interior of the vacuum vessel 962. Operating the vacuum pump can maintain the interior of the vacuum vessel with gaseous atmosphere at a prescribed pressure.

Figure 4:
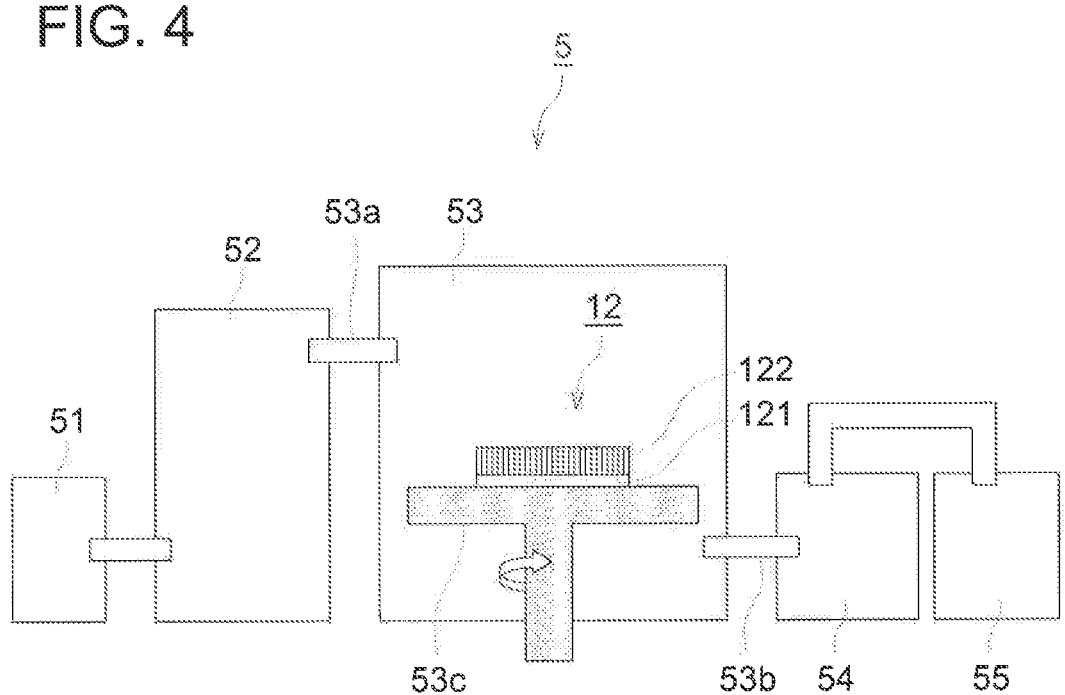
FIG. 4 is a schematic sectional view of an apparatus used for formation of a protective layer.

CVD Apparatus:

FIG. 4 shows an example of formation of a protective layer composed of poly(p-xylylene) on the surface of the phosphor layer 122 of the scintillator panel 12.

A CVD apparatus 5 is constituted of an evaporation room 51 in which di-p-xylylene as a raw material for poly(p-xylylene) is inserted and evaporated, a pyrolysis room 52 in which evaporated di-p-xylylene is heated and pylolyzed to form radicalized dip-xylylene, a vapor deposition room 53 in which such radicalized di-p-xylylene is allowed to be deposited on a scintillator formed on the surface of the phosphor layer 122 on the support 121, a cooling room 54 to perform deodorization and cooling, and an evacuation system 55 provided with a vacuum pump. As shown in FIG. 4, the vapor deposition room 53 is provided with a turn table 53c (deposition board) to perform deposition of poly(p-xylylene) together with an inlet 53a to introduce radicalized poly(p-xylylene) and an outlet 53b to exhaust excess poly(p-xylylene).

The scintillator panel 12 is placed with the phosphor layer 122 upward on the turn table 53c of the vapor deposition room 53. Then, heating to 175° C. is conducted in the evaporation room 51 to perform evaporation; heating to 690° C. is conducted in the pyrolysis room 52 to form di-p-xylylene radicals, which are introduced to the vapor deposition room 53 through the inlet 53*a* and deposited onto the phosphor layer 122 to form a 10 μm thick protective layer, poly(p-xylylene) film. In that case, the interior of the vapor deposition room 53 is maintained at a vacuum of 13 Pa. The turn table 53*c* is rotated at a rate of 4 rpm. Further, excess poly(p-xylylene) is exhausted from the outlet 53*b* and introduced to a cooling room 54 to perform cooling, a cooling room 54 to perform deodorization and cooling, and to an evacuation system 55 provided with a vacuum pump.

Scintillator Panel:

Next, there will be described a preparation method of a scintillator panel related to the present invention.

The vapor deposition apparatus 961 shown in FIG. 3 can be appropriately used in a preparation method of the radiation scintillator panel 12. There will be described a preparation method of the radiation scintillator panel 12 by using the vapor deposition apparatus 961.

Formation of Reflection Layer:

A metal thin film as a reflection layer (Al film, Ag Film or the like) is formed at an appropriate position of a support by a sputtering method. In cases when using a resin film as a support, various kinds of film in which Al film is deposited on resin film through sputtering, is commercially available and usable as a support 121 of the present invention.

Formation of Sublayer:

The sublayer 121*b* is formed by coating the composition of a polymeric binder dispersed or dissolved in an organic solvent and dried. An acryl resin, polyester resin or polyurethane resin is preferable for such a polymeric binder in terms of adhesiveness and corrosion resistance for the reflection layer.

Formation of Phosphor Layer:

The support 121 provided with a reflection layer and a sublayer is mounted on the holder 964 and plural boats 963 (not shown in the drawing) are filled with a powdery mixture of cesium iodide and thallium iodide (preliminary step). A mixing ratio of cesium iodide and thallium iodide within a boat may be the same in all of the boats, or two or more systems. The spacing between the boat 963 and the support 121 is set to a distance of 100 to 1500 mm and vapor deposition is conducted, while maintaining the spacing as set. Preferably, the spacing between the boat 963 and the support 121 is kept not less than 400 mm and not more than 1500 mm and vapor deposition is conducted, while simultaneously heating plural boats (963).

After completing the foregoing preliminary step, the evacuation pump 966 is operated to evacuate the interior of the vacuum vessel 962, which is set to a vacuum atmosphere of not more than 0.1 Pa. The vacuum atmosphere refers to an atmosphere at a pressure of not more than 100 Pa and an atmosphere at a pressure of not more than 0.1 Pa is suitable.

Next, inert gas such as argon or the like is introduced into the vacuum vessel 962 and the interior of the vacuum vessel is maintained at a vacuum atmosphere of 0.001 to 5 Pa, preferably 0.01 to 2 Pa. Thereafter, a heater of the holder and a motor of the rotation mechanism 965 are driven, and the support 121 fixed to the holder is heated, while rotating, while being opposed to the boat 963. The temperature of the support 121 is controlled preferably to 25 to 50° C. at the time of initiating evaporation and is maintained preferably at a temperature of 100 to 300° C., and more preferably 150 to 250° C. during evaporation.

In such a state, an electric current is applied from an electrode to the boat 963 and a mixture containing cesium iodide and thallium iodide is heated to such a temperature of 700° C. over a prescribed period of time to evaporate the mixture. Consequently, a number of columnar crystals grow successively on the surface of the support 121 to obtain crystals with an intended thickness (vapor deposition step). Thereafter, a support on which cesium iodide is deposited is taken out and the phosphor surface is cleaned by an adhesive roller. An activation treatment such as annealing may optionally be conducted.

The foregoing steps may be modified or be design alteration within the range without departing from the scope of the present invention.

As one of such modifications or design alterations, resistance heating in the foregoing vapor deposition stage may be replaced by an electron beam treatment or a high-frequency induction treatment. In the embodiments of the present invention, a heating treatment by a resistance heating method is preferred in terms of being easily treated by a relatively simple constitution at relatively low-cost and being applicable to various substances. Application of a resistance heating method to a heating treatment makes it feasible to achieve both a heating treatment of a mixture of cesium iodide and thallium iodide, and a vapor deposition treatment in the same boat 963.

As another modification or design alteration, a shutter (not shown in the drawing) to cut off the space from the boat 963 to the holder 964 may be disposed between the boat 063 and the holder 964 of the vapor deposition apparatus 961. In such a case, it can be prevented such that a substance other than the objective material is evaporated at the initial stage of evaporation and adheres to the support 121, thereby preventing columnar crystals from abnormal growth caused by foreign material generated at the initial stage of evaporation.

It is preferable to conduct a flattening treatment to eliminate sites such as abnormal growth due to evaporated foreign material and achieve enhanced adhesiveness to a light receiving element. Such a flattening treatment may employ pressure or pressure accompanied by heat, cutting or grinding, filling, or any other means to an extent of not destroying the columnar crystal structure of a phosphor, but it is preferred that a scintillator panel is subjected to a heat treatment under a pressure at an extent of atmospheric pressure, while being sandwiched by rigid plates to achieve enhanced uniformity of the phosphor layer surface.

Herein, an example of vapor deposition of a phosphor onto a resin support is cited, but even when using, as a support, FOP or amorphous carbon, a TFT glass substrate after forming a photodiode to form a light receiving element or silicon wafer before being subjected to laser dicing, vapor deposition is feasible. It is also feasible to change the deposition holder or to conduct masking.

Cutting of Scintillator Panel:

In cases when a support is glass or silicon, cutting is feasible by a laser dicing device. Further, in cases when a support is a resin film, it is preferable to use a laser cutting apparatus, as shown in FIG. 2*a*.

A scintillator plate cut by a laser treatment, in which a phosphor layer is formed over almost the entire region, and which has a broad image effective region, compared to the case of forming a phosphor layer on a cut support, is preferable. However, on the other hand, handling in the subsequent processes starting with formation of a protective layer becomes difficult. Accordingly, it is preferable to use a holding member for use in handling for a scintillator plate which has been cut. Such a holding member may be an instrument used for carrying a semiconductor, so-called vacuum attraction or electrostatic attraction. Alternatively, there may be used a sheet which is fixed through sticking or adhesion and is simply separable by a treatment such as heating, UV exposure, cooling, or ultrasonic wave application after completing the respective steps or before packaging. Further, such a sheet is cut to the shape of the scintillator panel and adhered to a rigid planar plate with double-faced adhesive tape, even in cases of being small-sized and broad varieties, subsequent steps such as picking-up after cutting or formation of a protective layer can be conducted together, leading to effective shortening of the overall processing time.

Formation of Protective Layer:

In the CVD apparatus shown in FIG. 4, a hot-melt resin is coated onto the protective layer 123 composed of poly(p-xylylene) or a peeling sheet coated with a peeling agent, then, the hot-melt resin face is disposed onto the phosphor layer surface of a scintillator panel and pasted together with compressing with a roller heated at 120° C. to form the protective layer 123. In cases when using an adhesive for adhesion onto the surface of a light receiving element, the thickness of the protective layer is controlled so that the total thickness of the protective layer and then adhesive layer is not more than 30 μm.

Adhesion of Scintillator Panel to Light Receiving Element:

When the scintillator panel 12 and the light receiving element 11 are pasted together with an adhesive, pressure of 10 to 500 fg/cm$^2$ (0.98 to 49 kPa) is applied thereto until the adhesive is solidified. Application of pressure removes bubbles from the adhesive layer. When using a hot-melt resin for the protective layer 123, the hot-melt resin is heated at a temperature higher by 10° C. than the melt initiation temperature of the hot-melt resin, while compressing at a pressure of 10 to 500 fg/cm$^2$ and after allowed to stand over 1 to 2 hours, cooling is gradually conducted. Rapid cooling damages pixels of a light receiving element by shrink stress. Preferably, cooling is conducted to a temperature of 50° C. or lower at a rate of not more than 20° C./h.

An adhesive can employ, for example, a cold curing type adhesive of acryl, epoxy or silicone. There is also usable a rubber type adhesive, as an elastic adhesive resin.

Examples of rubber type adhesive resins include a block copolymer such as styrene-isoprene-styrene, and a synthetic rubber such as polybutadiene or polybutylene. Preferred examples of commercially available rubber type adhesive include a one component type RTV rubber KE 420 (produced by Shinetsu Kagaku Kogyo Co. Ltd.).

A silicone adhesive may employ a peroxide curing type or addition condensation type, singly or in combination. Further, such a silicone adhesive may be mixed within acryl type adhesive or a rubber type adhesive. There may be used an adhesive in which a silicone component is allowed to pend to a polymeric main chain or side chain of an acryl type adhesive.

In cases when using an acryl resin as an adhesive, it is preferable to use a resin obtained by allowing a radical-polymerizable monomer containing an acrylic acid ester having an alkyl side chain of one to fourteen carbon atoms. It is also preferable to add, as a monomer component, an acrylic acid ester having a polar side chain such as a hydroxyl group, a carboxyl group or an amino group, or other vinyl monomers.

A viscous optical grease is also usable in the scintillator panel 12 or the light receiving element 11. There is usable any commonly known one which is highly transparent and viscous. Preferred examples of a commercially available optical grease include silicone oil KF 96H (Million CS, produced by Shinetsu Kagaku Kogyo Co. Ltd.).

EXAMPLES

In the following, the present invention will be described with reference to examples, but the present invention is by no means limited to these. In Examples, "part(s)" represents part(s) by mass, unless otherwise noted.

Preparation of Flat Panel Detector

Preparation of Support:

There was prepared a support provided with a sublayer and a reflection layer, as follows. Silver was sputtered to a 600× 600 mm size support, as shown in Table 1, to form a reflection layer (0.10 μm thick). The composition, as shown below, was dispersed in a beads mill over 15 hours to obtain a coating solution for a sublayer.

| | |
|---|---|
| Vylon 20SS (produced by Toyobo Co., Ltd., Polyester resin) | 300 parts by mass |
| Methyl ethyl ketone (MEK) | 200 parts by mass |
| Toluene | 300 parts by mass |
| Cyclohexanone | 150 parts by mass |

The coating solution was coated on the reflection layer side of the support by a spin coater so that the dry layer thickness was 1.0 μm, and dried at 100° C. over 8 hours to prepare a subbed support.

Formation of Phosphor Layer:

Using the vapor deposition apparatus described earlier, phosphor 1 (CsI alone) and phosphor 2 (CsI:0.03Tl mol %) were allowed to deposit on the sublayer side of the support to form a phosphor layer. A shutter was disposed between a boat (963) and a holder (964) to prevent a substance other than the objective material from being attached to the phosphor layer.

Specifically, the support was placed onto a support holder provided with a support rotation mechanism. Then, the foregoing phosphor materials, as evaporation materials were packed into crucibles, as an evaporation source, and the crucibles were disposed in the vicinity of the bottom of the vacuum vessel and on the circumference of a circle centered on a center line vertical to the support. The distance between the support and the evaporation source was adjusted to 500 mm and the distance between the center line vertical to the support and the evaporation source was adjusted to 300 mm.

Subsequently, after the interior of the vacuum vessel was evacuated, the vacuum degree was adjusted to 0.5 Pa, while introducing Ar gas and the temperature of the support was maintained at 30° C., while rotating the support at a rate of 10 rpm. Subsequently, the interior of the crucible was raised to a prescribed temperature by resistance heating. Subsequently, evaporation of the phosphor 1 was initiated without rotating the support and then, the temperature of the support (substrate) was raised to 200° C. When the thickness of a phosphor layer reached 200 μm, evaporation was terminated. Then, Corning glass (EAGLE 2000 or EAGLE XG) was overlaid on each of the support surface and the phosphor surface, placed into a sealable bag and sealed under vacuum. The thus sealed phosphor layer was subjected to a heat treatment at 100° C. over two hours, whereby a scintillator panel was obtained.

Cutting:

The thus obtained scintillator panel was placed on a supporting board of a laser cutting apparatus (YAG-UV) shown in FIG. 2a with the support upward (the support side on which a phosphor layer was not formed) and cut to a size of 24.7 mm×49.33 mm to form plural scintillator panels. Further, a pressure sensitive-adhesive, thermally peelable material was cut to pieces of a smaller size than that of 24.7 mm×49.33 mm, which were arranged on a polycarbonate sheet. Then, the polycarbonate sheet was pressed onto the plural scintillator panels. Subsequently, the scintillator panels were picked up and transferred to the step of forming a protective layer.
Preparation of Protective Layer:

The polycarbonate sheet on which plural scintillator panels were arranged was placed into a vapor deposition room of a CVD apparatus and exposed to vapor sublimed from a raw material of poly(P-xylylene), whereby a 10 μm thick poly(p-xylylene) film was formed on the scintillator panels and polycarbonate. After being allowed to stand in an atmosphere of 100° C. for 10 minutes, the polycarbonate sheet was peeled away to obtain the plural scintillator panels.
Bonding to Light Receiving Element:

There was used a light receiving element of an effective image area having CMOS (produced by Rad-icon Corp., Rad Eye 1/pixel size of 48 μm). In samples shown in Table 1, while the phosphor layer of a scintillator panel was opposed to a photoelectric conversion element, a sponge sheet for pressure control was placed on the substrate of a scintillator panel, a cover was put to an enclosure and fixed with threads to cause the scintillator panel to be coupled to the light receiving element under a pressure of 30 fg/cm$^2$.

An acrylic adhesive of the composition shown below was prepared and used for adhesion to the CMOS surface. This adhesive is highly releasable so that position change is easily feasible until start of the hot-bonding.

To 100 parts by mass of a mixture (A), expressed in solid contents, was added 1 part by mass of an aromatic isocyanate compound (B). Further thereto was added 60 ppm in solid equivalent of dioctyl tin dilaurate and diluted with ethyl acetate to obtain an adhesive composition of 30% solids.
(A)

| 2-Ethylhexyl acrylate | 50 parts by mass |
| Butyl acrylate | 30 parts by mass |
| Styrene | 19 parts by mass |
| 2-Hydroxyethyl methaorylate | 3 parts by mass |

(B)
Tolylene diisocyanate/trimethylolpropane adduct (trade name: Coronate L, produced by Nippon Polyurethane Co., Ltd.)

The foregoing adhesive was coated on the side of a protective layer (123) of a scintillator panel (12) so that the thickness was 10 μm and dried. Then, the scintillator panel and a CMOS portion were completely matched, while observing them by a stereo microscope. Thereafter, heating was conducted over 90 minutes in an atmosphere at 70° C., followed by gradual cooling, whereby the scintillator panel was coupled to a light receiving element (11).

Then, a cable to take signals was connected to the connector of the light receiving element (Rad Eye 1) to obtain a flat panel detector.
Evaluation of Flat Panel Detector:

A scintillator panel portion of each of the thus obtained scintillator panels was evaluated with respect to the affected region by a laser treatment and moisture resistance.
Measurement of Laser-Degraded Area:

In a scintillator panel before being covered with a protective layer, the side surface of a phosphor layer was observed by a laser confocal microscope and the ratio of laser-degraded area to side surface area of phosphor layer was calculated by using a image processing software.
Evaluation of Moisture Resistance:

The rear surface of a flat panel detector was exposed to X-rays at a tube voltage of 80 kVp through a MTF chart, the image data were read and recorded onto a hard disc. The data recorded on the hard disc were analyzed by a computer to determine a modulation transfer function (MTF) value at the initial stage [MTF value (%) at a spatial frequency cycle of 1/mm]. Further, samples were aged over 3 days under an atmosphere of 65° C. and 85% RH and the MTF value thereof was also determined. The ratio of MTF after aging to that before aging was determined as a measure of moisture resistance. When a MTF value after aging is not less than 80% of the MTF value before aging, it is acceptable in practice.

Evaluation results are shown in Table 1.

TABLE 1

| Scintillator Panel No. | Support | Direction of Laser Treatment | Laser-degraded Area (%) | Moisture Resistance (%) | Remark |
|---|---|---|---|---|---|
| 1 | PI | laser exposure from support side | 0 | 95 | Inv |
| 2 | PI | laser exposure from support side | 15 | 90 | Inv |
| 3 | PI | laser exposure from support side | 40 | 85 | Inv |
| 4 | PEN | laser exposure from support side | 10 | 93 | Inv |
| 5 | FOP | laser exposure from support side | 5 | 98 | Inv |
| 6 | Al | laser exposure from support side | 5 | 98 | Inv |
| 7 | PI | laser exposure from support side | 50 | 60 | Comp. |
| 8 | PI | laser exposure from phosphor layer side | 90 | 40 | Comp. |

PI: polyimide film
PEN: polyethylene naphthalate film
FOP: fiber optic plate
Al: aluminum plate As is apparent from Table 1, it was proved that a scintillator panel of the present invention, in which the degraded area produced by the cutting treatment accounted for 0 to 40% of the total side surface area of columnar crystals, was excellent in moisture resistance. Thus, the degraded area produced by the laser cutting treatment was relatively small and roughness of the side surface of a phosphor layer at the time when forming a phosphor layer was maintained, achieving enhanced adhesion of a protective layer. In cases when laser cutting was conducted from the phosphor layer side, it was required to allow laser to reach the support beyond the phosphor layer, rendering it difficult to make the degraded area narrow.

In the production method of the scintillator panel of the present invention, a phosphor layer is formed on a support with a large area, followed by being cut to a prescribed size. As a result, a region on the end surface of the support in which the phosphor layer was absent was relatively small, compared to the case of forming a phosphor layer on a support of a small area, rendering it feasible to achieve a broad image effective area.

What is claimed is:
1. A scintillator panel comprising:
a plurality of layers, the layers arranged sequentially in the order of a support, a phosphor layer and a protective layer,
wherein
the phosphor layer comprises columnar crystals, the phosphor layer having a bottom surface facing the support, a top surface opposite the bottom surface and side surfaces, the columnar crystals, at an end of the phosphor layer, have side surfaces with melted areas which are produced by a cutting treatment, and the melted areas account for not less than 1% and not more than 40% of an area of all of the side surfaces of the columnar crystals.

2. The scintillator panel of claim 1, wherein the melted areas account for not less than 1% and not more than 30% of the area of all of the side surfaces of the columnar crystals.

3. The scintillator panel of claim 1, wherein an area in which the phosphor layer is not provided on the support is within a range of 0.5 mm from an end of the support.

4. The scintillator panel of claim 1, wherein the protective layer comprises a resin and adheres to the phosphor layer.

5. The scintillator panel of claim 4, wherein the resin comprises poly(p-xylylene) or a hot-melt resin.

6. The scintillator panel of claim 1, wherein the support is a resin.

7. The scintillator panel of claim 1, wherein the support is an inorganic material.

8. A production method of a scintillator panel comprising a plurality of layers, the layers arranged sequentially in the order of a support, a phosphor layer and a protective layer, the method comprising:

forming the phosphor layer on the support; and cutting the support by exposing a reverse side of the support, on which the phosphor layer is not provided, to a laser;

wherein the phosphor layer comprises columnar crystals, the phosphor layer having a bottom surface facing the support, a top surface opposite the bottom surface and side surfaces, the columnar crystals, at an end of the phosphor layer, have side surfaces with melted areas which are produced by the cutting treatment, and the melted areas account for not less than 1% and not more than 40% of an area of all of the side surfaces of the columnar crystals.

9. The production method of claim 8, wherein the melted areas account for not less than 1% and not more than 30% of the area of all of the side surfaces of the columnar crystals.

10. The production method of claim 8, wherein an area in which the phosphor layer is not provided on the support is within a range of 0.5 mm from an end of the support.

11. The production method of claim 8, wherein the protective layer comprises a resin and adheres to the phosphor layer.

12. The production method of claim 11, wherein the resin comprises poly(p-xylylene) or a hot-melt resin.

13. The production method of claim 8, wherein the support is a resin.

14. The production method of claim 8, wherein the support is an inorganic material.

* * * * *